Dec. 5, 1950     V. A. COUNTER ET AL     2,532,539
TESTING DEVICE FOR RADIO OBJECT DETECTION SYSTEMS
Filed Oct. 3, 1945
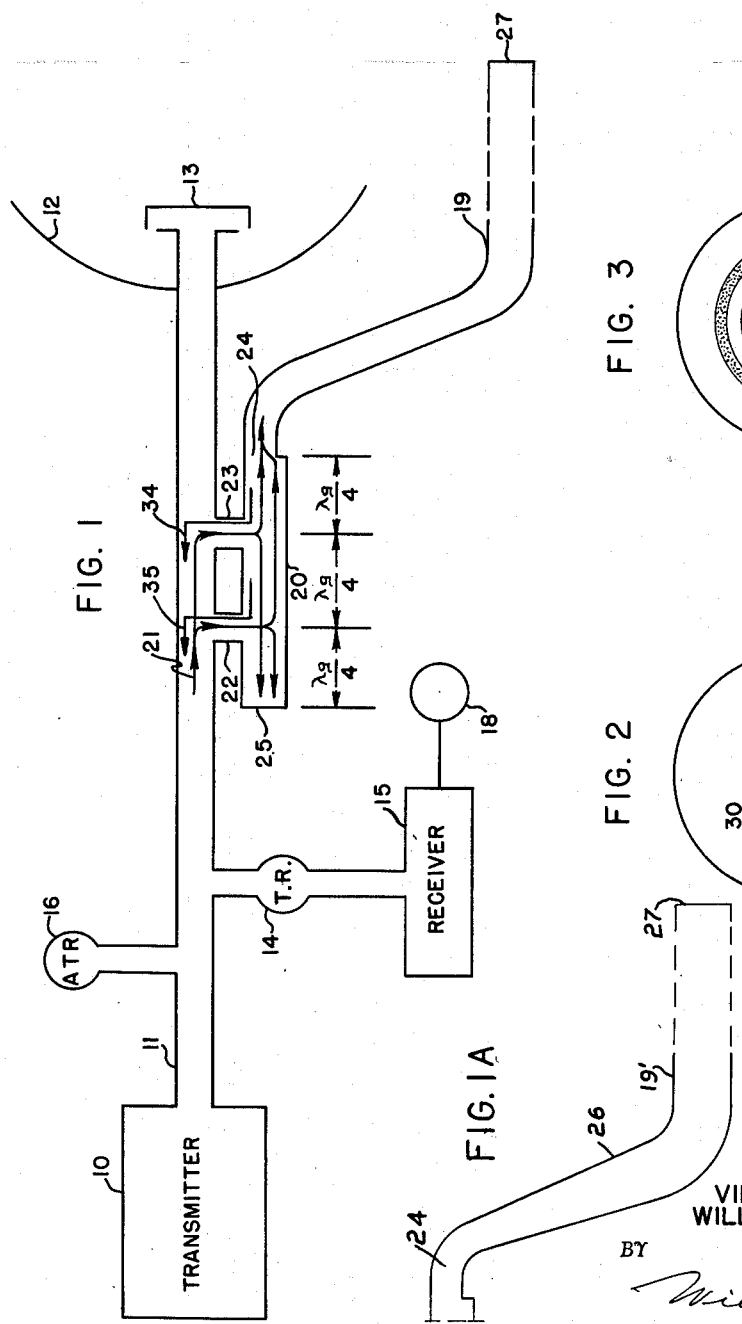
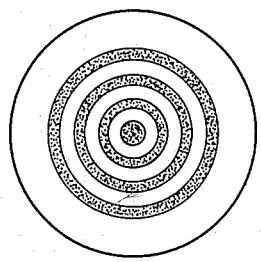
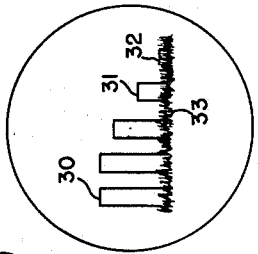
INVENTORS
VIRGIL A. COUNTER
WILLIAM M. FAIRBANK
JULIUS HALPERN
BY
ATTORNEY.

Patented Dec. 5, 1950

2,532,539

UNITED STATES PATENT OFFICE 2,532,539

TESTING DEVICE FOR RADIO OBJECT DETECTION SYSTEMS

Virgil A. Counter and William M. Fairbank, Cambridge, and Julius Halpern, Boston, Mass., assignors, by mesne assignments, to the United States of America as represented by the Secretary of War Application October 3, 1945, Serial No. 620,129

4 Claims. (Cl. 343—5)

This invention relates generally to electrical apparatus and, more specifically, to a self-calibrating device for a radio object detection system.

In one type of radio object detection system, pulses of radio frequency energy are radiated from an antenna in a directional beam. The directional beam is caused to scan a specified area by movement of the antenna. The number of pulses per second is called the pulse repetition frequency (prf) of the system. Certain objects interfere with the transmitted pulses and reflect a portion of the radio frequency energy back to the apparatus in the form of echo pulses. Each pulse is detected and amplified in the receiving channel and presented for display upon a cathode ray tube. The cathode ray tube presents the reflected echo pulses as intensified traces on the screen of the tube.

In one type of display known as a plan position indication (PPI) the intensified traces are presented in polar coordinates of the azimuth and range corresponding to the azimuth and range of the reflecting objects.

In another type of display known as type "A" presentation, the intensified traces are presented as pulses separated from the transmitted pulse by a distance indicative of the range of the reflection object.

In general, the system performance of such a system may be indicated by the difference between the peak power of the transmitted pulse and the peak power of the minimum detectable echo signal in the receiving channel. The system performance may depend upon a combination of factors within the R.-F. oscillator circuits, the transmission line components, and the receiver channel.

The frequency spectrum of each transmitted pulse will govern to some extent how well the echo signals are detected and reproduced in the receiver channel.

In the receiver channel, the overall receiver bandwidth must be sufficiently wide if echo signals are to be clearly resolved. The overall bandwidth of a receiver may be defined as the band of frequencies which are amplified to a usable amplitude in the receiver output.

All other system components including the tuning of the radio frequency transmission line fixtures as well as the efficiency of energy transfer through the transmission lines will affect the overall system performance.

It is desirable to not only operate a radio object detection system with optimum system performance but also to provide a convenient and accurate check on this characteristic.

It is an object of this invention to provide a means for conveniently and accurately determining the overall system performance of a radio object detection system. Another object is to provide said performance check with a minimum of test equipment.

Other objects, features and advantages of this invention will suggest themselves to those skilled in the art and will become apparent from the following description of the invention taken in connection with the accompanying drawings in which:

Fig. 1 shows a block diagram embodying the principles of this invention;

Fig. 1a shows a modification of Fig. 1;

Fig. 2 shows a cathode ray tube display obtained by the use of this invention; and Fig. 3 shows another cathode ray tube display.

Referring more specifically to Fig. 1, there is shown a block diagram of a typical radio object detection system embodying the principles of this invention. Transmitter 10, being properly matched to wave guide 11, feeds pulses of radio frequency energy to said wave guide. These pulses are conducted down the guide to a wave guide feed 13 and caused to be radiated in a directional beam by reflector 12. Transmit-receive (T-R) switch 14 prevents the major portion of the high power transmitted pulses from entering receiver 15 and by overloading causing damage to that channel. However, a portion of the transmitted pulse of insufficient intensity to overload the receiver but sufficient to be displayed on cathode ray tube 18, passes through the receiver and is displayed.

Certain objects interfere with said radio frequency pulses and reflect radio frequency energy in the form of echo pulses back to the apparatus. Each reflected echo pulse is caused to enter wave guide 11 by cooperation of reflector 12 and wave guide feed 13. The reflected echo pulse is prevented from returning back to the transmitter 10 by action of anti-transmit-receiver (A-T-R) switch 16. A-T-R switch 16 effectively produces an open circuit for the reflected echo pulse in the area where it is attached to the wave guide. T-R switch 14 now allows each reflected echo pulse to enter receiver 15 where it is detected, amplified, and presented for display upon cathode ray tube 18. The reflected echo pulses appear as intensified traces upon the screen of the cathode ray tube.

Reflector 12 together with wave guide feed 13 may be rotated about a vertical axis at an elevation angle of from zero to 90°. In being so rotated, the system is caused to scan a particular field of search.

An echo line 19 is connected to wave guide 11 by means of a standard wave selector coupling 20. The electrical length of the echo line is greater than the duration of the pulse. The end of the echo line 27 and end 25 of wave selector 20 is terminated by a reflecting impedance; in this case a short circuit.

As each transmitted pulse passes wave selector coupling 20 a predetermined portion of radio frequency energy is caused to enter echo line 19. A wave of radio frequency energy traveling in the direction indicated by solid line 21 will separate and enter wave selector 20 through openings 22 and 23. The electrical lengths of the wave selector 20 from short circuited end 25 to opening 22, from opening 22 to opening 23, and from opening 23 to outlet 24 are each one quarter plus a multiple of a half of the wave guide wavelength involved. The portion of the radio frequency energy entering through opening 22 will arrive at outlet 24 in phase with that portion entering through opening 23. Hence each of these portions will add to give a combined output. The portion of radio frequency energy entering through opening 22 and arriving at short circuited end 25 will be 180° out of phase with that portion which entered through opening 23 and arrived at short circuited end 25. Hence the total portion of the radio frequency energy represented by solid line 21 which reaches short circuited end 25 will be cancelled.

The wave selector therefore permits a predetermined portion of the transmitted energy to appear at outlet 24 and enter echo line 19. The pulse of radio frequency energy on traveling down the echo line 19 and reaching the short circuited end 27 is reflected back to the wave selector 20. Since the above process of wave selection for the radio frequency energy entering wave selector 20 and indicated by solid line 21 is reversible, a portion of the R.-F. energy of the echo pulse reflected from end 27 of line 19 is caused to enter wave guide 11 as indicated by lines 34 and 35, and be transmitted to the T-R switch 14. Each echo pulse is then detected in receiver 15, and presented for display on cathode ray tube 18. This reflected pulse will appear as a trace on the screen of the cathode ray tube with a range which is equivalent to the electrical length of the echo line 19.

The portion of the reflected echo pulse which does not reenter wave guide 11 will reflect upon short circuited end 25 of wave selector 20. The energy will travel back and forth in the echo line, being successively reflected from the ends and attenuated exponentially by the loss in the echo line. Each time the energy makes a round trip and passes the wave selector in the proper direction, a small fraction of the energy is coupled through the wave selector into the wave guide and receiver, appearing as a signal trace on the cathode ray tube indicator 18. Successive signals are decreased in strength by the round trip attenuation in the line. They appear on the indicator equally spaced in range, that spacing being equal to the round trip electrical length of the echo line.

The approximate appearance of these echoes in "A" type cathode ray tube presentation is shown by Fig. 2. The first pulse 30 is the transmitted pulse and each succeeding one is a reflected echo pulse from echo line 19. The minimum detectable signal is shown by pulse 31, since pulse 32 will not be observable in interfering noise 33. By observing the difference in power level of each succeeding echo pulse on display which appears as an unclipped signal and knowing the round trip loss in the echo line, the power level difference between the transmitted pulse and the minimum detectable signal may be determined. The number of echoes may be determined by counting or by measuring the range of the last observable echo. This provides a simple indication of the overall system performance of a radio object detection system.

The approximate appearance of the echo pulses in a PPI type cathode ray tube presentation is shown by Fig. 3. It is evident that the above conclusions on system performance described in connection with "A" type presentation apply equally well for PPI type presentations. In a PPI type cathode ray tube, the display is synchronized with the position of the reflector and wave guide feed assembly throughout 360° rotation. Thus, as the wave guide feed assembly is rotated, the pulses of Fig. 2 are displayed as concentric rings in Fig. 3. The concentric rings are shown each of the same density. However, it is to be understood that each succeeding ring should decrease in intensity until they become unobservable.

Other system functions may be checked by the above described apparatus. Since the electrical length of the echo line is known, the reflected echo pulses provide an accurate check on the range calibrating scales of the cathode ray tube display screen.

By observing the characteristics of the echo pulses first when the automatic volume control of the receiver circuits is operating and then when tuning the receiver by manual means, proper adjustments of the automatic volume control may be made.

By rotating the antenna reflector through its normal operating ranges, high reflections or arcing within the transmission line component may be detected. When such defects are present the echo signal will be interrupted.

Should the radio frequency transmitter be oscillating off the normal frequency and should the frequency spectrum be poor, the echo line signals may be very poorly resolved on the display screen.

Poorly resolved echo signals may also indicate that the receiver bandwith is not satisfactory for the particular pulse width being transmitted.

The T-R and the A-T-R box, tuning adjustments, and all other adjustments throughout the transmission line components may be tuned for optimum performance by observing the adjustment where the echo pulses are more clearly defined on the display screen of the cathode ray tube. In order to prevent real target echoes from reaching the receiver during the testing, a reflector element must be inserted between the antenna feed and the reflector. In order to include as many transmission line components as possible during a test, the wave selector should be placed as close as possible to the antenna feed. It is evident that with such a testing procedure as described above, the gains of the antenna reflector, the wave guide, or any other radio frequency transmission component back to the wave selector is not included in this measure of system performance.

The electrical length of the echo line must be made such that the transmitted pulse is over before the first reflected pulse returns back to the receiving circuits. Hence, this apparatus is practical only when the radio object detecting system is using a relatively short transmitted pulse allowing the echo line to be of reasonable length. Since the electrical length of the echo line is greater than the pulse duration no tuning is required within the line.

For optimum performance of this apparatus it has been found that the echo line should be of certain specifications. For higher frequencies it is desirable that the inside of the echo line be coated with a good conductor such as silver. The attenuation to radio frequency energy is thereby considerably reduced and more reflected echoes will be displayed upon the cathode ray tube screen. This aids in converting the display traces into usable data.

At higher frequencies the attenuation in a long, small cross sectional area echo line may be excessive. Therefore by increasing the cross sectional area of the echo line and using a short flared guide to join it to the wave selector, the attenuation is reduced and a more readily discernible trail of signals will be indicated. Fig. 1a illustrates the increased cross sectional area of echo line 19' joined to outlet 24 by flared guide 26.

For relatively low frequency bands it has been found that the attenuation is reduced, and such flared connection of the large echo line may not be necessary.

While there has been described what is at present considered to be a preferred embodiment of this invention, it will be obvious to those skilled in the art that various changes and modifications may be made therein without departing from the scope of the invention as set forth in the appended claims.

What is claimed is:

1. In combination, a first and second transmission circuit, coupling means interconnecting said first and second transmission circuits for extracting a signal traveling in one direction through said first transmission circuit, and for applying said extracted signal to said second transmission circuit, said second transmission circuit including means for allowing said extracted signal to traverse said second transmission circuit for a predetermined distance and for reflecting substantially all of said extracted signal back to said coupling means whereby a portion enters said first transmission circuit in a direction opposite to the direction said extracted signal was traveling, and a means for causing the successive remainders of said reflected signals to again traverse said second transmission circuit for said predetermined distance and be reflected back to said coupling means.

2. A testing device for use with a pulse-echo detection system having as components thereof a transmitter, a receiver including an associated indicator, an antenna and a transmission line interconnecting said components; said device comprising a first means in circuit with said transmission line to take from said line a portion of the output of said transmitter; and a second means coupled to said first means to delay said portion for a predetermined length of time, to reflect said portion and to reinsert a portion thereof into said line; said first means reflecting the unreinserted portion thereof, and said second means similarly delaying and reflecting substantially all of said unreinserted portion and reinserting a portion thereof into said line; said first and second means causing successive unreinserted portions to complete the same cycle.

3. In combination, wave guide means, a pulsed transmitter and an antenna respectively connected at spaced points of said guide means, a receiver connected to said guide means at a point intermediate said transmitter and antenna, and an indicator connected to said receiver, directional coupler means connected to said guide intermediate said antenna and receiver for extracting from said guide a pulse of signal energy travelling from said transmitter to said antenna, delay line means connected to said coupler means for delaying and reflecting a major portion of said signal energy, said coupler means reinserting a portion of said reflected energy into said guide means for transmission to said receiver and reflecting the unreinserted and successive remainders thereof to said delay line means for delaying and reflecting substantially all of said unreinserted portion and successive remainders thereof, said coupler reinserting into said guide means portions of each of said remainders for transmission to said receiver whereby there is presented on said indicator simultaneous indications of said pulse signal energy and the reinserted portions of the successive remainders thereof.

4. In combination, wave guide transmission means, a pulsed transmitter and an antenna at opposite points thereof, a receiver at an intermediate point thereof, directional coupler means for extracting a pulse of signal energy travelling from the transmitter to the antenna, wave guide delay means having one end connected to said coupler means for delaying the signal, a first reflector means at the other end of said delay means for reflecting substantially all of said signal to said coupler means whereby a portion thereof is transmitted to said receiver, a second reflector means incorporated in said coupler means for reflecting the remainder of said reflected signal into said delay means, said remainder continuing to decay in exponential fashion as successive remainders of said reflected energy are transmitted similarly to the receiver.

VIRGIL A. COUNTER.
WILLIAM M. FAIRBANK.
JULIUS HALPERN.

REFERENCES CITED

The following references are of record in the file of this patent:

UNITED STATES PATENTS

| Number | Name | Date |
|---|---|---|
| 2,345,932 | Gould | Apr. 4, 1944 |
| 2,403,232 | Parisier | July 2, 1946 |
| 2,421,016 | Deloraine et al. | May 27, 1947 |
| 2,423,390 | Korman | July 1, 1947 |
| 2,433,868 | Sensiper | Jan. 6, 1948 |
| 2,460,827 | Isely | Feb. 8, 1949 |
| 2,489,075 | Bishop | Nov. 22, 1949 |